United States Patent
Dingli et al.

(10) Patent No.: US 11,932,268 B2
(45) Date of Patent: Mar. 19, 2024

(54) METHODS AND APPARATUS FOR TAMPER DETECTION OF A VEHICLE SYSTEM

(71) Applicant: PlusAI, Inc., Cupertino, CA (US)

(72) Inventors: Robert Joseph Dingli, Cupertino, CA (US); Timothy P. Daly, Jr., San Jose, CA (US)

(73) Assignee: PlusAI, Inc., Cupertino, CA (US)

( * ) Notice: Subject to any disclaimer, the term of this patent is extended or adjusted under 35 U.S.C. 154(b) by 0 days.

(21) Appl. No.: 17/827,279

(22) Filed: May 27, 2022

(65) Prior Publication Data
US 2023/0399000 A1  Dec. 14, 2023

(51) Int. Cl.
*G06F 21/86* (2013.01)
*B60W 50/02* (2012.01)
*B60W 50/035* (2012.01)
*B60W 50/14* (2020.01)
*B60W 60/00* (2020.01)

(52) U.S. Cl.
CPC ...... *B60W 50/035* (2013.01); *B60W 50/0205* (2013.01); *B60W 50/14* (2013.01); *B60W 60/00188* (2020.02); *G06F 21/86* (2013.01); *B60W 2050/0215* (2013.01)

(58) Field of Classification Search
CPC .......... B60W 50/035; B60W 50/0205; B60W 50/14; B60W 60/00188; B60W 2050/0215; G06F 21/86
See application file for complete search history.

(56) References Cited

U.S. PATENT DOCUMENTS

| | | | |
|---|---|---|---|
| 11,080,978 B1 * | 8/2021 | Goldstein | G08B 13/16 |
| 11,577,739 B1 * | 2/2023 | Walli | G06F 1/3234 |
| 2005/0134440 A1 * | 6/2005 | Breed | G01S 17/931 |
| | | | 701/45 |
| 2008/0173494 A1 * | 7/2008 | Lang | B60R 25/04 |
| | | | 180/289 |

(Continued)

FOREIGN PATENT DOCUMENTS

CN   201501382 U   *   6/2010

OTHER PUBLICATIONS

YouTube video entitled "Tracking CARS with Apple's AirTags! Does I really work?" uploaded on Feb. 22, 2022 by user "Marina Tech" Retrieved from Internet on May 22, 2023: < https://www.youtube.com/watch?v=Wpx6iHLvKDE>. (Year: 2022).*

(Continued)

*Primary Examiner* — Donald J Wallace
*Assistant Examiner* — Daniel M. Robert
(74) *Attorney, Agent, or Firm* — Sheppard Mullin Richter & Hampton LLP

(57) ABSTRACT

A system includes an electronic control unit (ECU) having a housing and configured to be disposed within an interior of an autonomous vehicle. The system also includes an inertial measurement unit (IMU) rigidly disposed with the housing of the ECU. The system also includes a processor configured to receive measurement data from the IMU. The IMU and the processor is powered by a battery separate from a power source of the ECU. The processor is configured to identify a tamper event of the ECU based on the measurement data from the IMU. The processor is also configured to send a signal to cause a tamper response of the tamper event.

20 Claims, 5 Drawing Sheets

(56) References Cited

U.S. PATENT DOCUMENTS

| | | | | |
|---|---|---|---|---|
| 2013/0033381 A1* | 2/2013 | Breed | ............... | G08B 13/2417 |
| | | | | 340/568.1 |
| 2017/0313269 A1* | 11/2017 | Breed | ................... | B60N 2/002 |
| 2019/0216014 A1* | 7/2019 | Hahn | ..................... | B60L 53/62 |
| 2020/0042751 A1* | 2/2020 | Hars | ..................... | B60R 25/34 |
| 2020/0160633 A1* | 5/2020 | Zhang | ................. | B60R 25/102 |
| 2020/0272221 A1* | 8/2020 | Foster | .................. | H04B 1/005 |
| 2020/0406908 A1* | 12/2020 | Soryal | ................. | G05D 1/0088 |
| 2021/0078538 A1* | 3/2021 | Hardenia | ............... | B60R 25/32 |
| 2022/0201888 A1* | 6/2022 | Ross | ................ | H01R 13/6691 |
| 2022/0242451 A1* | 8/2022 | Hammoud | ............ | G08G 1/052 |

OTHER PUBLICATIONS

Safran, product brief entitled, "Apr. 6, 2022-product-brief-stim210-a4_high-quality-print," found at: <chrome-extension://efaidnbmnnnibpcajpcglclefindmkaj/https://sensonor.azurewebsites.net/media/z55mowrx/2022-04-06-product-brief-stim210-a4_high-quality-print.pdf>. (Year: 2022).*

* cited by examiner though not limited to, full operation with no driver input (alternatively, operation without continuous driver input) in limited circumstances. The autonomous vehicle can be configured to operate in other modes, such as a fully autonomous mode, a partially autonomous mode, a driver assistance mode, and/or the like.

METHODS AND APPARATUS FOR TAMPER DETECTION OF A VEHICLE SYSTEM

FIELD

The present disclosure relates to tamper detection in vehicles such autonomous vehicles, and more specifically, to using an inertial measurement unit to detect tamper to ensure safety of the vehicles.

BACKGROUND

Autonomous driving is an emerging field where sensing and control technology facilitates a computer system in a moving vehicle to make correct vehicle control decisions in dynamic situations. In such applications, the computer system for controlling the autonomous driving system in autonomous vehicles can be deployed in the vehicle to constantly monitor the autonomous vehicle and provide autonomous driving decisions. Such monitoring functionalities can be based on, for example, data provided by different kinds of sensors located on the autonomous vehicles. For instance, it is typically desirable for the moving vehicle to detect clearly and accurately what obstacles are in the sensor(s) field-of-view and to determine various relevant parameters associated with each of the observed obstacles to make safe autonomous driving decisions. It is also desirable for these sensors and the computer system for controlling the autonomous driving system to provide continuous, clear, and accurate information. Therefore, a need exists to ensure the reliability and safety of autonomous driving system.

SUMMARY

In some embodiments, a non-transitory, processor-readable medium storing processor-readable instructions that when executed cause a processor to receive measurement data from an inertial measurement unit (IMU) rigidly disposed with an interior of a housing of an electronic control unit (ECU) of a vehicle (such as an autonomous vehicle). The processor and a power source of the IMU and the processor are disposed within the interior of the housing of the ECU. The housing the ECU is positioned within the vehicle to prevent access to the interior of the housing until after the housing of the ECU is moved. A tamper event of the ECU is identified at the processor based on the measurement data from the IMU. A signal is sent from the processor to cause a tamper response to the tamper event.

In some embodiments, a system includes an electronic control unit (ECU) having a housing and configured to be disposed within an interior of a vehicle (such as an autonomous vehicle). The system also includes an inertial measurement unit (IMU) rigidly disposed with the housing of the ECU. The system also includes a processor configured to receive measurement data from the IMU. The IMU and the processor is powered by a battery separate from a power source of the ECU. The processor is configured to identify a tamper event of the ECU based on the measurement data from the IMU. The processor is also configured to send a signal to cause a tamper response of the tamper event.

In some embodiments, a method includes sending, from an inertial measurement unit (IMU) rigidly disposed with a housing of an electronic control unit (ECU) of a vehicle (such as an autonomous vehicle), measurement data to a processor to cause the processor to identify a tamper event of the ECU based on the measurement data and in response to the receiving the measurement data. The processor and a power source of the IMU and the processor are disposed within the interior of the housing ECU. The measurement data indicates a movement of the ECU relative to the vehicle. The method also includes receiving, from the processor after the tamper event has been identified and at the ECU, a signal to cause the ECU to be disabled in response to the signal.

DETAILED DESCRIPTION

Figure 1A:
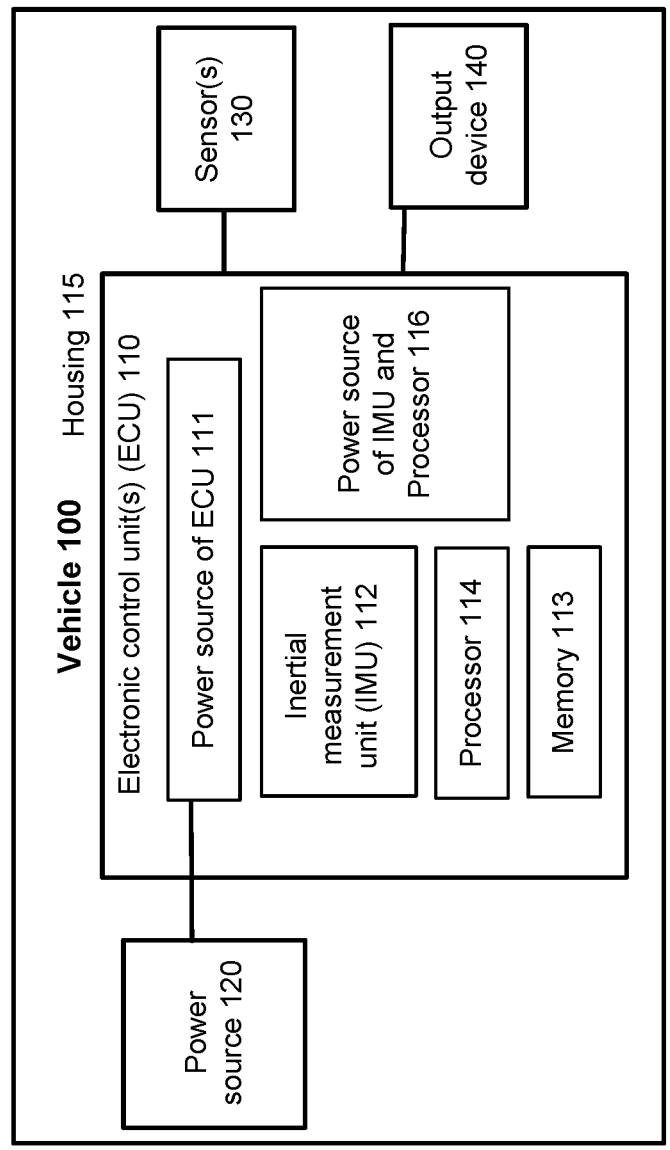
FIG. 1A is a block diagram of a vehicle that can detect tamper, according to an embodiment.

Autonomous driving is an emerging field where sensing and control technology is essential for facilitating the computer system in a moving vehicle to make correct vehicle control decisions in dynamic situations. Thus, autonomous vehicles often face safety challenges to make sure the autonomous driving system is working correctly and accurately.

In such applications, electronic control unit (ECU) for controlling the autonomous driving system in autonomous vehicles may be deployed in the vehicle to constantly monitor the autonomous vehicle and provide autonomous driving decisions. Such monitoring functionalities may come from data provided by different kinds of sensors located on the autonomous vehicles. For instance, the moving vehicle needs to "see" clearly and accurately what obstacles are in the field of view and to determine various relevant parameters associated with each of the observed obstacles to make safe autonomous driving decisions. These sensors and the ECU for controlling the autonomous driving system need to be able to provide continuous, clear, and accurate information. Therefore, a need exists to ensure the reliability and safety of autonomous driving system, and to prevent unauthorized part installation.

A vehicle can operate in a manual driving mode, or a vehicle can operate in a manual driving mode during one time period and operate in a partially autonomous mode or a fully autonomous driving mode during a different time period. As used herein, an "autonomous vehicle" refers to any vehicle (e.g., a ground vehicle such as a car, truck, semi-truck, etc.) and can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 4-0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

Autonomous vehicles described herein can be configured to wirelessly communicate with one or more remote compute devices, during periods of time when wireless connectivity is available/possible, for a variety of purposes including, but not limited to: receiving third-party data, receiving global positing system (GPS) data, receiving navigation commands, receiving or transmitting map data, receiving remote sensor data (i.e., data from sensors not disposed within or on the autonomous vehicle, but pertinent to the operations of the autonomous vehicle, such as sensors to detect road moisture, wind and temperature data associated with one or more locations along a route of travel, earthquake detection instruments (e.g., seismometers), etc.), transmitting sensor data generated at the autonomous vehicle, transmitting alerts, etc.

FIG. 1A is a block diagram of a vehicle 100 (such as an autonomous vehicle) that can detect tamper, according to an embodiment. The vehicle 100 can be any type of vehicle, such as a car, bus, or semitruck. As shown in FIG. 1, the vehicle 100 includes an electronic control unit (ECU) 110, power source 120 of the vehicle 100, sensor(s) 130 communicatively coupled to the ECU 110, and an output device 140 communicatively coupled to the ECU 110. The ECU 110 is communicatively coupled to the sensor(s) 130 and a plurality of operational systems (not shown) of the vehicle 100 through a communications network (not shown). The communications network can be any suitable communications network(s) for transferring data. In some instances, the communication network(s) can be a wired network such as, an Ethernet backbone network, a controller area network (CAN), a local interconnect network (LIN), a media-oriented system transport (MOST), a fiber-optic network, a digital subscription line ("DSL") network, a broadband network, and/or a flexray network. In other instances, the communication network(s) can a wireless network such as, for example, a Wi-Fi or wireless local area network ("WLAN"), a wireless wide area network ("WWAN"), and/or a cellular network. The communication network interconnects ECU 110 with sensor(s) 130 and other operational systems within the vehicle and exchanges information between ECU 110 and sensor(s) 130 and/or other operational systems.

The ECU 110 includes a housing 115, a power source 111, an inertial measurement unit (IMU) 112, a processor 114, and memory 113. A power source 116 can power IMU 112 and processor 114. The memory 113 is operatively connected to the processor 114. In some implementations, the power source 111 of ECU 110 is operatively connected to the power source 120 of vehicle 100. The power source 116 is independent from the power source 111 of the ECU 110. In some implementations, the power source 116 can be a battery. The processor 114, the IMU 112, and the power source 116 are disposed within an interior of the housing 115 of the ECU 110. The housing 115 of the ECU 110 is positioned within the vehicle 100 to prevent access to the interior of the housing 115 until after the housing 115 of the ECU 110 is moved.

The IMU 112 is independent from the sensor(s) 130. Stated differently, the sensor(s) 130 in the vehicle are separate from does not include the IMU 112. The IMU 112 is not directly coupled to a chassis of the vehicle 100. The IMU 112 can be rigidly disposed with the housing 115 of the ECU 110. For example, the IMU 112 can be rigidly disposed with the housing 115 of the ECU 110 in the sense that IMU 112 is attached or coupled to the housing 115 for example without being bendably or flexibly moveable relative to the housing. With such a rigid disposing, attachment or coupling, if the housing 115 were to be moved, bumped, or shaken, the IMU 112 would be able to detect such movement, bumping or shaking.

The processor 114 can be configured to perform (or cause to be performed) any of the techniques discussed herein. The processor 114 can be or include, for example, a hardware based integrated circuit (IC) or any other suitable processing device configured to run and/or execute a set of instructions or code. For example, the processor 114 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 114 can be configured to run any of the methods and/or portions of methods discussed herein. Although as shown in FIG. 1A the processor is disposed within the ECU 110, in alternative implementations the processor 114 can be disposed within the vehicle 100 but outside of the ECU 110, or the processor can be remote from the vehicle 100. The processor 114 is associated with security of the ECU 110 and not associated with steering the vehicle 100. The IMU 112 is configured to send the measurement data to the processor 114 and not to a processor associated with steering the vehicle 100. IMU 112 can measure acceleration at the housing 115 of the ECU 110 and generate measurement data (acceleration data) based on the measurement.

The memory 113 can be, for example, a random-access memory (RAM), a memory buffer, a hard drive, a read-only memory (ROM), an erasable programmable read-only memory (EPROM), and/or the like. The memory 113 can be configured to store sensor data collected by the sensor(s) 130, IMU 112 state data or IMU 112 change of state data, and any other data used by the processor 114 to perform the techniques discussed herein. In some instances, the memory 113 can store, for example, one or more software programs and/or code that can include instructions to cause the processor 114 to perform one or more processes, functions, and/or the like. In some implementations, the memory 113 can include extendible storage units that can be added and used incrementally. In some implementations, the memory 130 can be a portable memory (for example, a flash drive, a portable hard disk, and/or the like) that can be operatively coupled to the processor 114. In some instances, the memory 113 can be remotely operatively coupled with a compute device (not shown). For example, a remote database device can serve as a memory and be operatively coupled to the processor 114. The ECU 110 can access data stored on the memory 130, for example, the ECU 110 can access at least one of IMU state data or IMU change of state data in the memory 130, upon power up of the ECU 110.

The memory 113 can store the instructions that can be executed by the processor 114, and/or data detected by the sensor(s) 130. The memory 113 can store one or more software algorithm(s) (not shown). The software algorithm(s) can be, for example, an artificial intelligence (AI) model(s) or algorithm(s), a machine learning (ML) model(s) or algorithm(s), an analytical model(s) or algorithm(s), a rule-based model(s) or algorithm(s), or a mathematical model(s) or algorithm(s). After the processor 114 has received the measurement data from the IMU 112, the processor 114 can process the data using software algorithm(s) to identify a tamper event of the ECU 110 based on the measurement data.

The sensor(s) 130 can include one or more sensors for collecting sensor data associated with the vehicle 100. The sensor(s) 130 can be used to observe and gather any information that would be useful for performing the techniques discussed herein, such as information associated with an external environment of the vehicle 100 and/or the vehicle 100 itself. The sensor(s) 130 can include, for example, at least one of a camera, a radar, a lidar, a sonar, or an IMU that is different from IMU 112 (and that is mounted to the vehicle structure external to the ECU housing). The sensor(s) 130 can generate sensor data that includes representations of attributes associated with the vehicle 100, such as a speed of the vehicle 100, location, an acceleration of the vehicle 100, a size of the vehicle 100, a weight of the vehicle 100, etc. For example, the IMU that is different from the IMU 112 can measure the acceleration of the vehicle 100 and generate sensor data (acceleration data) based on the measurement. Additionally or alternatively, the sensor(s) 130 can generate sensor data that includes representations of attributes associated with an external environment of the vehicle 100, such as a speed, location, acceleration, size, type, relative distance, movement pattern, etc. of other vehicles, pedestrians, animals, obstacles, rain drops, snowflakes, haze particle, fog particle, etc., and/or location, type, relative distance, size, shape, etc. of signs, lane markers, shoulder areas, roads, buildings, etc. In some implementations, sensor data collected by the sensor(s) 130 includes information representing a topography surrounding the vehicle 100, such as a road, sign, traffic light, walkway, building, body of water, etc. The camera can be for example one or more of: a thermal imager camera, an infrared camera, a stereo camera, a time of flight camera, an red/green/blue (RGB) camera, a 2-D camera, a 3-D camera, a 360-degree camera, etc. The radar can be for example one or more of: an imaging radar, a 3-D radar, a 4-D radar, a short-range radar, a medium-range radar, a long-range radar, a pulse-Doppler radar, a frequency-modulated continuous-wave (FMCW) radar, etc. The lidar can be for example one or more of: an amplitude modulated lidar, a frequency modulated lidar, a mechanical lidar, a microelectromechanical systems lidar, a flash lidar, an optical phase array lidar, a frequency-modulated continuous-wave (FMCW) lidar, a time of flight scanning lidar, etc. The sonar can be for example one or more of: an active sonar, a passive sonar, etc. The IMU that is different from the IMU 112 can use, for example, one or more of an accelerometer(s), a gyroscope(s) or a magnetometer(s). Of course, other types of sensors exist and the examples above are not meant to be exhaustive.

The vehicle 100 can be, for example, a medium truck, heavy truck, very heavy truck, a vehicle that is greater than 14,000 pounds, a vehicle that is greater than 26,000 pounds, a vehicle that is greater than 70,000 pounds, or a vehicle that is greater than 80,000 pounds. To ensure that larger vehicles have sufficient time/distance to perform appropriate actions, tamper event may be detected sufficiently in advance.

Output device 140 can be any type of device that provide a notification to the driver or another device connected to the output device 140. For example, the output device 140 can be an audio speaker, a visual indicator such as a light or display, a vibrating device, or a communication device to send a notification to a connected device. The notification can be for example an audible indicator (e.g., an alarm sound), a visual indicator (e.g., a flashing light), a vibrating indicator (e.g., a haptic movement), a notification message that can be sent to operation center to get approval request for installation of updates for ECU and/or sensor(s), etc.

Figure 1B:
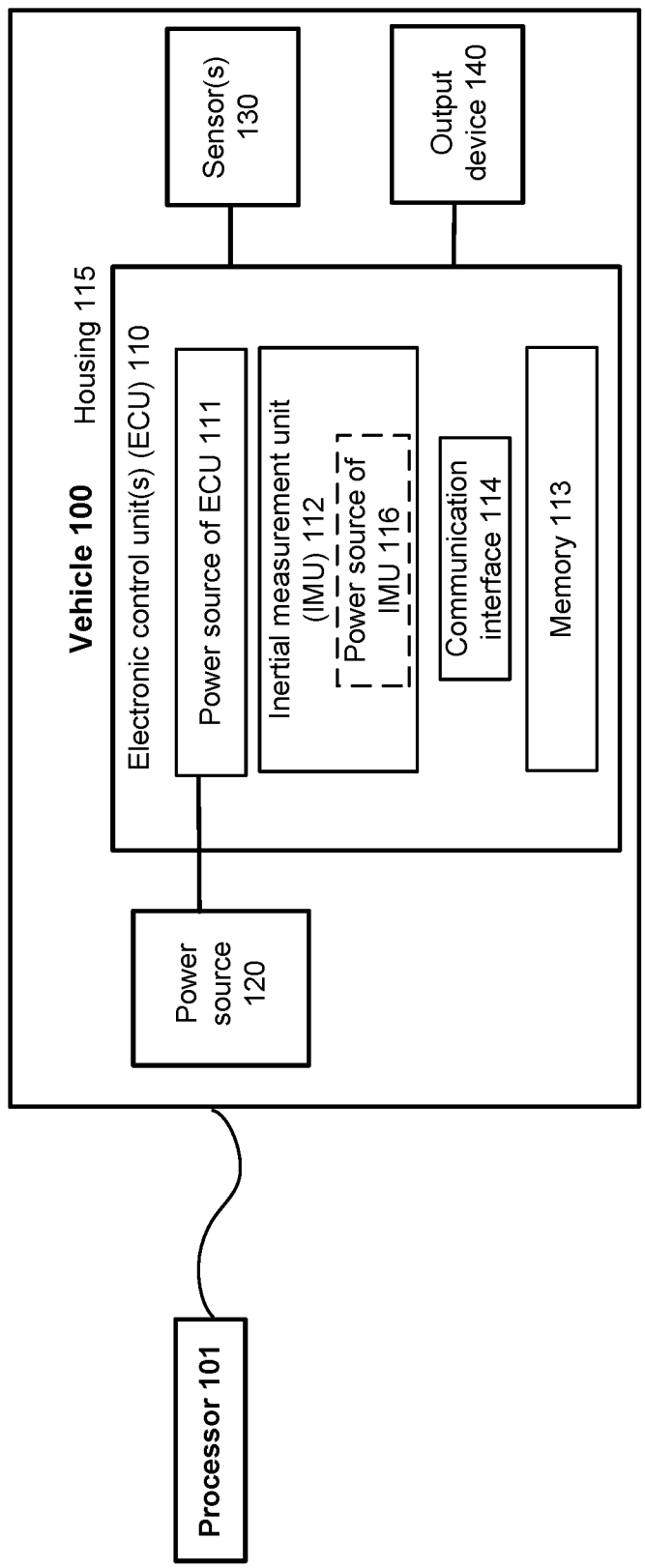
FIG. 1B is a block diagram of a vehicle that can detect tamper, according to another embodiment.

FIG. 1B is a block diagram of a vehicle (such as an autonomous vehicle) that can detect tamper, according to another embodiment. The vehicle 100 can be any type of vehicle, such as a car, bus, or semitruck. As shown in FIG. 1, the vehicle 100 includes an electronic control unit (ECU) 110, power source 120, sensor(s) 130 communicatively coupled to the ECU 110, and an output device 140 communicatively coupled to the ECU 110. The ECU 110 is communicatively coupled to the sensor (s) 130 and a plurality of operational systems of the vehicle 100 (not shown) through a communications network (not shown). The communications network can be any suitable communications network(s) for transferring data. In some instances, the communication network(s) can be a wired network such as, an Ethernet backbone network, a controller area network (CAN), a local interconnect network (LIN), a media-oriented system transport (MOST), a fiber-optic network, a digital subscription line ("DSL") network, a broadband network, and/or a flexray network. In other instances, the communication network(s) can a wireless network such as, for example, a Wi-Fi or wireless local area network ("WLAN"), a wireless wide area network ("WWAN"), and/or a cellular network. The communication network interconnects ECU 110 with sensor(s) 130 and other operational systems within the vehicle and exchanges information between ECU 110 and sensor(s) 130 and/or other operational systems (not shown). The ECU 110 includes a power source of ECU 111, an inertial measurement unit (IMU) 112, a communication interface 114 operatively coupled to the IMU 112, and memory 113. The IMU 112 includes a power source 116 of the IMU 112. The vehicle 100 is operatively coupled to a processor 101 through a wireless network. The processor 101 is located remotely from the vehicle 100. The communication interface 114 is configured to operatively couple the IMU 112 to the processor 101 via the wireless network. In some implementations, the power source 111 of ECU 110 is operatively connected to the power source 120 of vehicle 100. The power source 116 of the IMU 112 is independent from the power source of the ECU 111. In some implementations, the power source 116 of the IMU 112 can be a battery. The processor 101, the IMU 112, and the power source 116 are disposed within an interior of the housing 115 of the ECU 110. The housing 115 of the ECU 110 is positioned within the vehicle 100 to prevent access to the interior of the housing 115 until after the housing 115 of the ECU 110 is moved.

The IMU 112 is independent from the sensor(s) 130. Stated differently, the sensor(s) 130 in the autonomous vehicle does not include the IMU 112. The IMU 112 is not directly coupled to a chassis of the vehicle 100. The sensor(s) 130, however, can include an IMU that is different from IMU 112 and that is mounted to the vehicle structure external to (separate from) the housing 115 of the ECU 110.

The processor 101 can be configured to perform (or cause to be performed) any of the techniques discussed herein. The processor 101 can be or include, for example, a hardware based integrated circuit (IC) or any other suitable processing device configured to run and/or execute a set of instructions or code. For example, the processor 101 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 101 can be configured to run or execute any of the methods and/or portions of methods discussed herein. Although as shown in FIG. 1B, the processor is located remotely from the vehicle 100, it can be understood that the processor can be disposed within (or with) the vehicle 100 but outside of the ECU 110, or the processor can be disposed within the ECU 110. The processor 101 is associated with security of the ECU 110 and not associated with steering the vehicle 100. The IMU 112 is configured to send the measurement data to the processor 101 and not to a processor associated with steering the vehicle 100.

The memory 113 can be, for example, a random-access memory (RAM), a memory buffer, a hard drive, a read-only memory (ROM), an erasable programmable read-only memory (EPROM), and/or the like. The memory 113 can be configured to store sensor data collected by the sensor(s) 130, IMU state data or IMU change of state data, and any other data used by the processor 101 to perform the techniques discussed herein. In some instances, the memory 113 can store, for example, one or more software programs and/or code that can include instructions to cause the processor 101 to perform one or more processes, functions, and/or the like. In some implementations, the memory 113 can include extendible storage units that can be added and used incrementally. In some implementations, the memory 130 can be a portable memory (for example, a flash drive, a portable hard disk, and/or the like) that can be operatively coupled to the processor 101. In some instances, the memory 113 can be remotely operatively coupled with a compute device (not shown). For example, a remote database device can serve as a memory and be operatively coupled to the processor 101. The ECU 110 can access data stored on the memory 130, for example, the ECU 110 can access at least one of IMU state data or IMU change of state data in the memory 130, upon power up of the ECU 110.

The memory 113 can store the instructions that can be executed by the processor 101, and/or data detected by the sensor(s) 130. The memory 113 can store one or more software model(s) or algorithm(s) (not shown). The software model(s) or algorithm(s) can be, for example, an artificial intelligence (AI) model(s) or algorithm(s), a machine learning (ML) model(s) or algorithm(s), an analytical model(s) or algorithm(s), a rule-based model(s) or algorithm(s), or a mathematical model(s) or algorithm(s). After the processor 101 has received the measurement data from the IMU 112, the processor 101 can process the data using software algorithm(s) to identify a tamper event of the ECU 110 based on the measurement data.

The sensor(s) 130 can include one or more sensors for collecting sensor data associated with the vehicle 100. The sensor(s) 130 can be used to observe and gather any information that would be useful for performing the techniques discussed herein, such as information associated with an external environment of the vehicle 100 and/or the vehicle 100 itself. The sensor(s) 130 can include, for example, at least one of a camera(s), a radar(s), a lidar(s), a sonar(s), or an IMU(s) that is different from IMU 112 (and that is mounted to the vehicle structure external to the ECU housing). The sensor(s) 130 can generate sensor data that includes representations of attributes associated with the vehicle 100, such as a speed of the vehicle 100, location, an acceleration of the vehicle 100, a size of the vehicle 100, a weight of the vehicle 100, etc. For example, the IMU that is different from the IMU 112 can measure the acceleration of the vehicle 100 and generate sensor data (acceleration data) based on the measurement. Additionally or alternatively, the sensor(s) 130 can generate sensor data that includes representations of attributes associated with an external environment of the vehicle 100, such as a speed, location, acceleration, size, type, relative distance, movement pattern, etc. of other vehicles, pedestrians, animals, obstacles, rain drops, snowflakes, haze particle, fog particle etc., and/or location, type, relative distance, size, shape, etc. of signs, lane markers, shoulder areas, roads, buildings, etc. In some implementations, sensor data collected by the sensor(s) 130 includes information representing a topography surrounding the vehicle 100, such as a road, sign, traffic light, walkway, building, body of water, etc. The camera can be for example one or more of: a thermal imager camera, an infrared camera, a stereo camera, a time of flight camera, an red/green/blue (RGB) camera, a 2-D camera, a 3-D camera, a 360-degree camera, etc. The radar can be for example one or more of: an imaging radar, a 3-D radar, a 4-D radar, a short-range radar, a medium-range radar, a long-range radar, a pulse-Doppler radar, a frequency-modulated continuous-wave (FMCW) radar, etc. The lidar can be for example one or more of: an amplitude modulated lidar, a frequency modulated lidar, a mechanical lidar, a microelectromechanical systems lidar, a flash lidar, an optical phase array lidar, a frequency-modulated continuous-wave (FMCW) lidar, a time of flight scanning lidar, etc. The sonar can be for example one or more of: an active sonar, a passive sonar, etc. The IMU (that is different from the IMU 112) can include, for example, one or more of an accelerometer(s), a gyroscope(s) or a magnetometer(s). Of course, other types of sensors exist and the examples above are not meant to be exhaustive.

As mentioned above, the ECU 110 has a communication interface 114 operatively coupled to the IMU 112. The communication interface 114 is configured to operatively couple the IMU 112 to the processor 101 via the wireless network.

The vehicle 100 can be, for example, a medium truck, heavy truck, very heavy truck, a vehicle that is greater than 14,000 pounds, a vehicle that is greater than 26,000 pounds, a vehicle that is greater than 70,000 pounds, or a vehicle that is greater than 80,000 pounds. To ensure that larger vehicles have sufficient time/distance to perform appropriate actions, tamper event may be detected sufficiently in advance.

Figure 2:
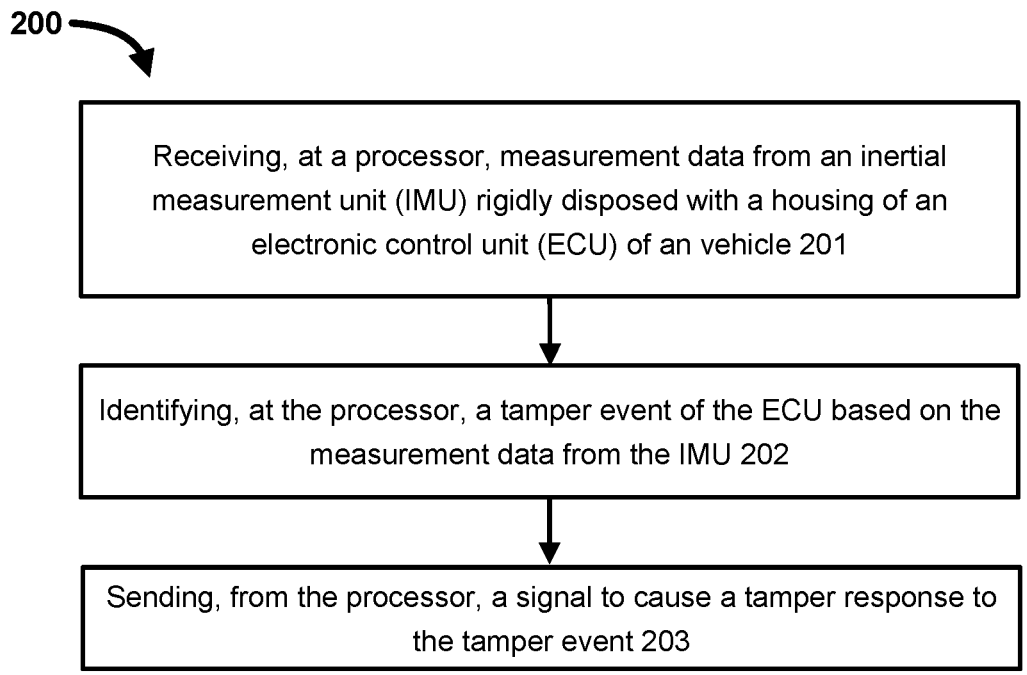
FIG. 2 is a flow diagram of a method for tamper detection, according to an embodiment.

FIG. 2 is a flow diagram of a method for tamper detection, according to an embodiment. The method 200 of FIG. 2 can be implemented, for example, using the processor 114 and the ECU 110 of the vehicle 100 in FIG. 1A, or the processor 101 and the ECU 110 of the vehicle 100 in FIG. 1B.

As shown in FIG. 2, at 201, the method begins with receiving, at a processor (e.g., processor 114 in FIG. 1A or processor 101 in FIG. 1B), measurement data from an inertial measurement unit (IMU) (e.g., IMU 112 in FIG. 1A and FIG. 1B) rigidly disposed with a housing 115 of an electronic control unit (ECU) (e.g., ECU 110 in FIG. 1A and FIG. 1B) of an vehicle (e.g., vehicle 100 in FIG. 1A and FIG. 1B).

The measurement data can be data detected by the IMU from individual sensor(s) (e.g., sensor(s) 130 in FIG. 1A and FIG. 1B) or a group of sensors and/or ECU (e.g., ECU 110 in FIG. 1A and FIG. 1B). In some implementations, the measurement data can detect whether the sensor(s) and/or ECU has been physically moved/relocated. Stated differently, the measurement data can indicate a movement of the ECU and/or sensor(s) relative to the vehicle. For example, each sensor(s) and ECU can include a Near Filed Communication (NFC) tag that can be detected by the IMU. When a sensor(s) and/or ECU is moved or relocated, the NFC signal detected by the IMU can indicate a movement of the ECU and/or sensor(s) relative to the vehicle. Of course, other type of communication connections can be used to communicate the detected movement of the ECU and/or sensor(s), for example, an Ethernet backbone network, a controller area network (CAN), a local interconnect network (LIN), a media-oriented system transport (MOST), a fiber-optic network, a digital subscription line ("DSL") network, a broadband network, and/or a flexray network, a Wi-Fi or wireless local area network ("WLAN"), a wireless wide area network ("WWAN"), Gigabit Multimedia Serial Link (GMSL), and/or a cellular network. In some implementations, sensor data such as camera data can be received as measurement data to indicate a movement of the ECU and/or sensors. For example, cameras disposed on the vehicle can detect location changes of ECU and/or sensor(s) if the location of the ECU and/or sensor(s) is within the field of view of the camera. Of course, any type of suitable techniques and methods can be used to detect movement of the ECU and/or sensor(s). The list and examples above are not meant to be exhaustive. The IMU 112 is independent from the sensor(s) 130. Stated differently, the sensor(s) 130 in the vehicle does not include the IMU 112.

The sensor(s) can include one or more sensors such as, for example, a camera(s), a radar(s), a lidar(s), a sonar(s), or an IMU(s) that is different from IMU 112 (and that is mounted to the vehicle structure external to the ECU housing). The camera can be, for example, a thermal imager camera, an infrared camera, a stereo camera, a time of flight camera, an RGB camera, a 2-D camera, a 3-D camera, a 360-degree camera, etc. The radar can be, for example, an imaging radar, a 3-D radar, a 4-D radar, a short-range radar, a medium-range radar, a long-range radar, a pulse-Doppler radar, a frequency-modulated continuous-wave (FMCW) radar, etc. The lidar can be, for example, an amplitude modulated lidar, a frequency modulated lidar, a mechanical lidar, a microelectromechanical systems lidar, a flash lidar, an optical phase array lidar, a frequency-modulated continuous-wave (FMCW) lidar, a time of flight scanning lidar, etc. The sonar can be, for example, an active sonar, a passive sonar, etc. The IMU (that is different from the IMU 112) can include, for example, one or more of an accelerometer(s), a gyroscope(s) or a magnetometer(s). Of course, other types of sensors exist and the examples above are not meant to be exhaustive.

At 202, the method continues with identifying, at the processor (e.g., processor 114 in FIG. 1A or processor 101 in FIG. 1B), a tamper event of the ECU (e.g., ECU 110 of FIG. 1A and FIG. 1B) based on the measurement data from the IMU (e.g., IMU 112 in FIG. 1A and FIG. 1B). The tamper event can include, for example, detection of movement of the ECU and/or sensor(s), detection of whether power supply of ECU and/or sensor(s) has been removed or if backup battery is needed, detection of changes in the ECU and/or sensor(s), detection of spoofing in the ECU and/or sensor(s). The detection of movement of the ECU can be performed by comparing the measurement data (e.g., acceleration data) measured at the IMU at the housing of the ECU (e.g., IMU 112 in FIG. 1A) with the measurement data (e.g., acceleration data) measured at the IMU mounted to the vehicle structure external to the ECU housing (e.g., an IMU from sensor(s) 13) in FIG. 1A). The detection of changes can include, for example, detection of whether an update (e.g., a software update) is needed in the ECU and/or sensor(s) and getting an approval for installation from a remote operation center/server, detection of lapses in communication in the ECU and/or sensor(s).

In some implementations, the tamper event detection can happen in the vehicle. In other implementations, the tamper event detection can happen outside of the vehicle. For example, tamper event can be a detection of a failure to communicate to a remote operation center/server (e.g., according to a predefined schedule), an unauthorized backup of all the firmware and settings of the ECU and/or sensor(s) in the remote operation center/server, an unauthorized system level health check for ECU and sensor(s), and spoof detection for firmware and updates. In some implementations, a backup, system level health check, system level updates, etc. are to be approved by the remote operation center/server and a failure to receive such approval indicates an unauthorized event.

At 203, the method continues with sending, from the processor (e.g., processor 114 in FIG. 1A or processor 101 in FIG. 1B), a signal to cause a tamper response to the tamper event. In some implementations, the tamper response is disabling the ECU and/or sensor(s). In an event when the ECU and/or sensor(s) is detected to be powered up but has not, the disabling signal is directly sent to the ECU and/or sensor(s) to cause the ECU and/or sensor(s) to be disabled. In an event when the ECU and/or sensor(s) is detected to be not powered up, a signal is sent to a remote operation center to cause the remote operation center to send the disabling signal to the ECU and/or sensor(s) when the ECU and/or sensor(s) is later powered up without authorization to cause the ECU and/or sensor(s) to be disabled in response to the signal.

In some other implementations, the tamper response is to provide a notification of the tamper event of the ECU and/or sensor(s) and send a signal to an output device to cause the output device (e.g., output device 140 in FIG. 1A and FIG. 1B) to output the notification. The notification can be for example an audible indicator (e.g., an alarm sound), a visual indicator (e.g., a flashing light), a vibrating indicator (e.g., a haptic movement), a notification message that can be sent to operation center to get approval request for installation of updates for ECU and/or sensor(s), etc.

In some implementations, the tamper response can be an alignment(s) and calibration(s) of ECU(s) and/or sensor(s) to ensure the versions and updates are compatible, and data are reliable, automatically triggering of recalibrations especially for sensor(s) such as lidars and cameras because these type of sensors have limited tolerance for error. The implementations, alignments, calibrations and recalibrations of ECU(s) and/or sensor(s) can be initiated from in the vehicle or can be initiated remotely through wireless connection. In some implementations, the tamper response can cause an improvement in data accuracy and alignment of ECU(s) and/or sensors. For example, during radar and camera sensor fusion, the IMU may detect that the resolution is limited, fusion stops working, or data doesn't align. In these situations, the tamper response can be an action to improve of the sensors' resolution and/or restart the sensor fusion, etc. In other implementations, tamper response can be an action to change or swap ECU(s) and/or sensor(s) to improve accuracy and alignment. For example, if it is determined that the ECU(s) and sensor(s) is damaged or degraded, the tamper response can be an action to cause the ECU(s) and sensor(s) to be checked more frequently and actively. Upon determination that a replacement is recommended, a signal can be sent to the remote operation center/server to get approval. In these situations, authorization/approval from the remote operation center/server can be required before the replacement can be done. Additional discussion related to sensor tamper detection are discussed in U.S. Pat. No. 11,077,825, the contents of which are incorporated in its entirety herein.

In some implementations, a tamper event can be an event associated with spoofing activities. For example, when an Address Resolution Protocol (ARP) request from a new MAC address is received at a processor at the vehicle (e.g., the ECU(s), the sensor(s) or the IMU), the information can be logged and monitored (e.g., at the processor of the ECU(s)) so when anything unexpected is connected to a processor at the vehicle, tamper event is detected. A tamper response to these kinds of situations can be, for example, shutting down the network in response to detecting an unexpected login.

Figure 3:
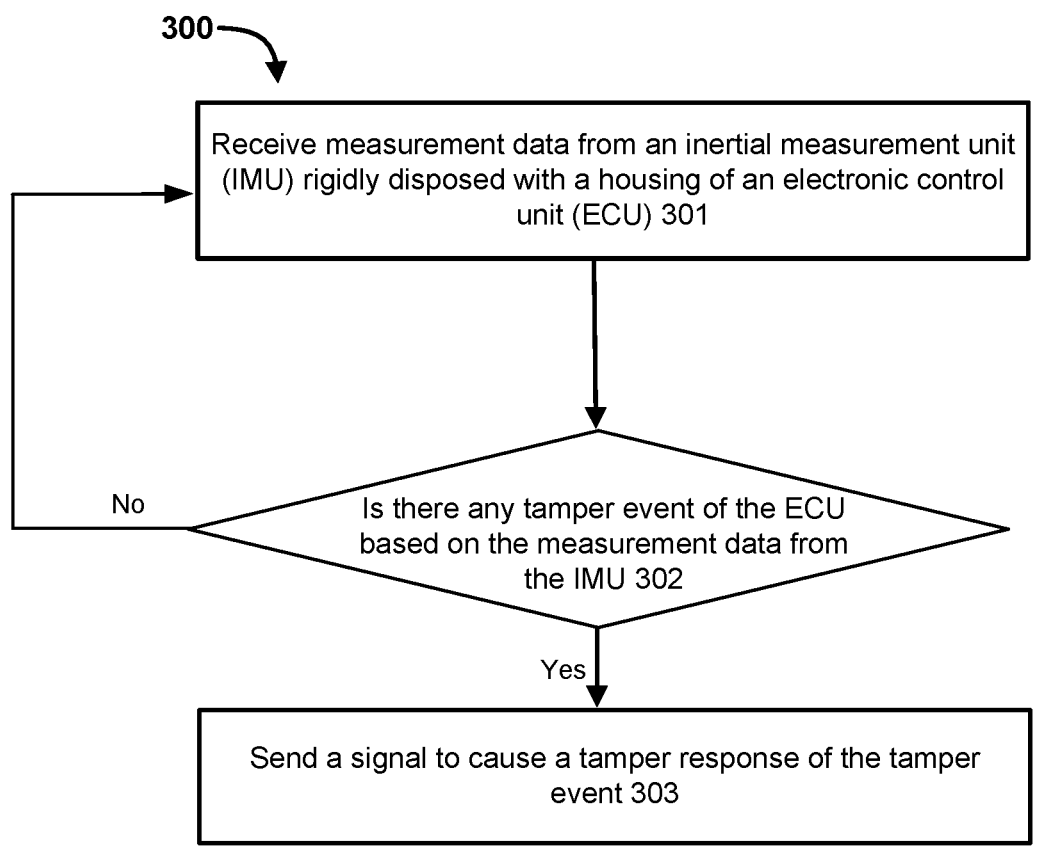
FIG. 3 is a flow diagram of a method for tamper detection, according to another embodiment.

FIG. 3 is a flow diagram of a method for tamper detection, according to another embodiment. The method 300 of FIG. 3 can be implemented, for example, using the processor 114 and the ECU 110 of the vehicle 100 in FIG. 1A, or the processor 101 and the ECU 110 of the vehicle 100 in FIG. 1B.

As shown in FIG. 3, at 301, the method begins with receiving, at a processor (e.g., processor 114 in FIG. 1A or processor 101 in FIG. 1B), measurement data from an inertial measurement unit (IMU) (e.g., IMU 112 in FIG. 1A and FIG. 1B) rigidly disposed with a housing 115 of an electronic control unit (ECU) (e.g., ECU 110 in FIG. 1A and FIG. 1B) of a vehicle (e.g., vehicle 100 in FIG. 1A and FIG. 1B).

The measurement data can be data detected by IMU at the housing of the ECU with respect to individual sensor(s) (e.g., sensor(s) 130 in FIG. 1A and FIG. 1B) or a group of sensors and/or ECU (e.g., ECU 110 in FIG. 1A and FIG. 1B). The IMU at the housing of the ECU is independent from the sensor(s). Stated differently, the sensor(s) in the vehicle (which can include a separate IMU mounted to the vehicle structure) does not include the IMU at the housing of the ECU. In some implementations, the IMU at the housing of the ECU uses the detected measurement data to determine whether the sensor(s) and/or ECU has been physically moved/relocated. Stated differently, the measurement data detected by the IMU at the housing of the ECU can indicate a movement of the ECU and/or sensor(s) relative to the vehicle. For example, the measurement data (acceleration data) detected by the IMU at the housing of the ECU can be compared to the measurement data (acceleration date) detected by the separate IMU (mounted to the vehicle structure) included within the sensors, and differencing between the measurement data can indicate movement of the ECU and/or a tamper event. For another example, each sensor(s) and ECU can include a Near Filed Communication (NFC) tag that can be detected by the IMU. When a sensor(s) and/or ECU is moved or relocated, the NFC signal detected by the IMU can indicate a movement of the ECU and/or sensor(s) relative to the vehicle. Of course, other type of communication connections can be used to communication the detected movement of the ECU and/or sensor(s), for example, an Ethernet backbone network, a controller area network (CAN), a local interconnect network (LIN), a media-oriented system transport (MOST), a fiber-optic network, a digital subscription line ("DSL") network, a broadband network, and/or a flexray network, a Wi-Fi or wireless local area network ("WLAN"), a wireless wide area network ("WWAN"), Gigabit Multimedia Serial Link (GMSL), and/or a cellular network. In some implementations, sensor data such as camera data can be received as measurement data to indicate a movement of the ECU and/or sensors. For example, cameras disposed on the vehicle can detect location changes of ECU and/or sensor(s) if the location of the ECU and/or sensor(s) is within the field of view of the camera. Of course, any type of suitable techniques and methods can be used to detect movement of the ECU and/or sensor(s). The list and examples above are not meant to be exhaustive.

The sensor(s) can include one or more sensors such as, for example, a camera(s), a radar(s), a lidar(s), a sonar(s), or an IMU(s) that is different from the IMU at the housing of the ECU (and that is mounted to the vehicle structure external to the ECU housing). The camera can be, for example, a thermal imager camera, an infrared camera, a stereo camera, a time of flight camera, an RGB camera, a 2-D camera, a 3-D camera, a 360-degree camera, etc. The radar can be, for example, an imaging radar, a 3-D radar, a 4-D radar, a short-range radar, a medium-range radar, a long-range radar, a pulse-Doppler radar, a frequency-modulated continuous-wave (FMCW) radar, etc. The lidar can be, for example, an amplitude modulated lidar, a frequency modulated lidar, a mechanical lidar, a microelectromechanical systems lidar, a flash lidar, an optical phase array lidar, a frequency-modulated continuous-wave (FMCW) lidar, a time of flight scanning lidar, etc. The sonar can be, for example, an active sonar, a passive sonar, etc. The IMU (that is different from the IMU at the housing of the ECU) can use, for example, one or more of an accelerometer(s), a gyroscope(s) or a magnetometer(s). Of course, other types of sensors exist and the examples above are not meant to be exhaustive.

At 302, the method continues to determine whether any tamper event of the ECU (e.g., ECU 110 of FIG. 1A and FIG. 1B) based on the measurement data from the IMU (e.g., IMU 112 in FIG. 1A and FIG. 1B) can be identified, at the processor (e.g., processor 114 in FIG. 1A or processor 101 in FIG. 1B). If there is tamper event identified, method continues to 303. If there is no tamper event identified, method returns back to 301. The tamper event can include, for example, detection of movement of the ECU and/or sensor(s), detection of whether power supply of ECU and/or sensor(s) has been removed or if backup battery is needed, detection of changes in the ECU and/or sensor(s), detection of spoofing in the ECU and/or sensor(s). The detection of changes can include, for example, detection of whether an update (e.g., a software update) is needed in the ECU and/or sensor(s) and getting an approval for installation from a remote operation center/server, detection of lapses in communication in the ECU and/or sensor(s).

In some implementations, the tamper event detection can happen in the vehicle. In other implementations, the tamper event detection can happen outside of the vehicle. For example, tamper event can be a detection of a failure to communicate to a remote operation center/server (e.g., according to a predefined schedule), an unauthorized backup of all the firmware and settings of the ECU and/or sensor(s) in the remote operation center/server, an unauthorized system level health check for ECU and sensor(s), and spoof detection for firmware and updates. In some implementations, a backup, system level health check, system level updates, etc. are to be approved by the remote operation center/server and a failure to receive such approval indicates an unauthorized event.

At 303, the method continues with sending, from the processor (e.g., processor 114 in FIG. 1A or processor 101 in FIG. 1B), a signal to cause a tamper response to the tamper event. In some implementations, the tamper response is disabling the ECU and/or sensor(s). In an event when the ECU and/or sensor(s) is detected to be powered up but has not, the disabling signal is directly sent to the ECU and/or sensor(s) to cause the ECU and/or sensor(s) to be disabled. In an event when the ECU and/or sensor(s) is detected to be not powered up, a signal is sent to a remote operation center, to cause the remote operation center to send the disabling signal to the ECU and/or sensor(s) when the ECU and/or sensor(s) is later powered up without authorization to cause the ECU and/or sensor(s) to be disabled in response to the signal.

In some other implementations, the tamper response is to provide a notification of the tamper event of the ECU and/or sensor(s) and send a signal to an output device to cause the output device (e.g., output device 140 in FIG. 1A and FIG. 1B) to output the notification. The notification can be for example an audible indicator (e.g., an alarm sound), a visual indicator (e.g., a flashing light), a vibrating indicator (e.g., a haptic movement), a notification message that can be sent to operation center to get approval request for installation of updates for ECU and/or sensor(s), etc.

In some implementations, the tamper response can be an alignment(s) and calibration(s) of ECU(s) and/or sensor(s) to ensure the versions and updates are compatible, and data are reliable, automatically triggering of recalibrations especially for sensor(s) such as lidars and cameras because these type of sensors have limited tolerance for error. The implementations, alignments, calibrations and recalibrations of ECU(s) and/or sensor(s) can be initiated from in the vehicle or can be initiated remotely through wireless connection. In some implementations, the tamper response can cause an improvement in data accuracy and alignment of ECU(s) and/or sensors. For example, during radar and camera sensor fusion, the IMU may detect that the resolution is limited, fusion stops working, or data doesn't align. In these situations, the tamper response can be an action to improve of the sensors' resolution and/or restart the sensor fusion, etc. In other implementations, tamper response can be an action to change or swap ECU(s) and/or sensor(s) to improve accuracy and alignment. For example, if it is determined that the ECU(s) and sensor(s) is damaged or degraded, the tamper response can be an action to cause the ECU(s) and sensor(s) to be checked more frequently and actively. Upon determination that a replacement is recommended, a signal can be sent to the remote operation center/server to get approval. In these situations, authorization/approval from the remote operation center/server can be required before the replacement can be done. Additional discussion related to sensor tamper detection are discussed in U.S. Pat. No. 11,077,825, the contents of which are incorporated in its entirety herein.

In some implementations, a tamper event can be an event associated with spoofing activities. For example, when an Address Resolution Protocol (ARP) request from a new MAC address is received at a processor at the vehicle (e.g., the ECU(s), the sensor(s) or the IMU), the information can be logged and monitored (e.g., at the processor of the ECU(s)) so when anything unexpected is connected to a processor at the vehicle, tamper event is detected. A tamper response to these kinds of situations can be, for example, shutting down the network in response to detecting an unexpected login.

Figure 4:
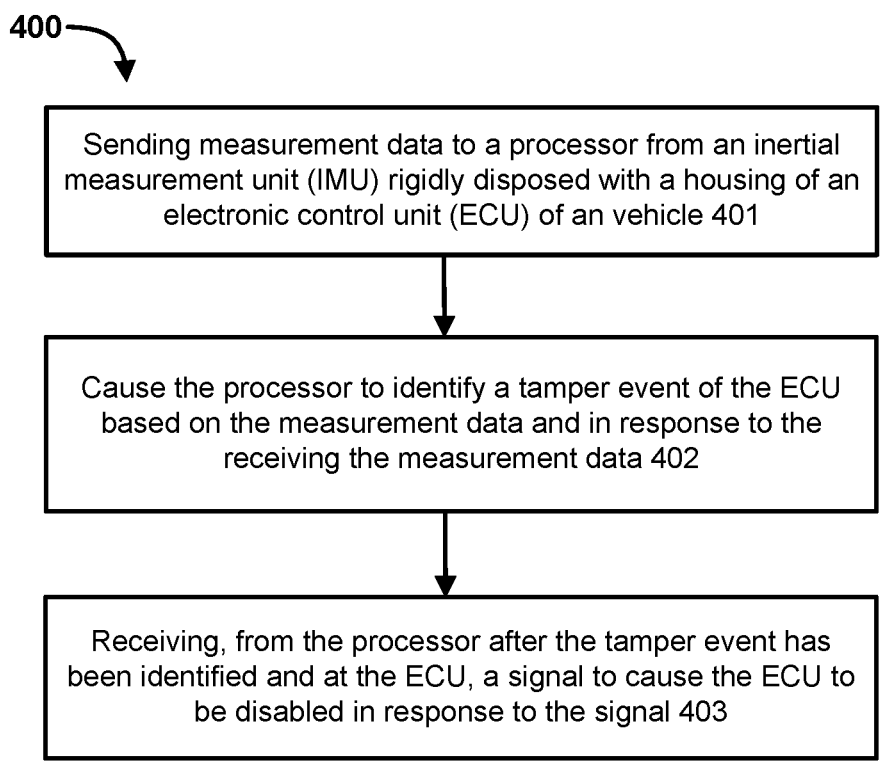
FIG. 4 is a flow diagram of a method for tamper detection, according to yet another embodiment.

FIG. 4 is a flow diagram of a method for tamper detection, according to yet another embodiment. The method 400 of FIG. 4 can be implemented, for example, using the processor 114 and the ECU 110 of the vehicle 100 in FIG. 1A, or the processor 101 and the ECU 110 of the vehicle 100 in FIG. 1B.

As shown in FIG. 4, at 401, the method begins sending measurement data to a processor (e.g., processor 114 in FIG. 1A or processor 101 in FIG. 1B) from an inertial measurement unit (IMU) (e.g., IMU 112 in FIG. 1A and FIG. 1B) rigidly disposed with a housing 115 of an electronic control unit (ECU) (e.g., ECU 110 in FIG. 1A and FIG. 1B) of an vehicle (e.g., vehicle 100 in FIG. 1A and FIG. 1B).

The measurement data can be data detected by the IMU from individual sensor(s) (e.g., sensor(s) 130 in FIG. 1A and FIG. 1B) or a group of sensors and/or ECU (e.g., ECU 110 in FIG. 1A and FIG. 1B). In some implementations, the measurement data can detect whether the sensor(s) and/or ECU has been physically moved/relocated. Stated differently, the measurement data can indicate a movement of the ECU and/or sensor(s) relative to the vehicle. For example, each sensor(s) and ECU can include a Near Filed Communication (NFC) tag that can be detected by the IMU. When a sensor(s) and/or ECU is moved or relocated, the NFC signal detected by the IMU can indicate a movement of the ECU and/or sensor(s) relative to the vehicle. Of course, other type of communication connections can be used to communicate the detected movement of the ECU and/or sensor(s), for example, an Ethernet backbone network, a controller area network (CAN), a local interconnect network (LIN), a media-oriented system transport (MOST), a fiber-optic network, a digital subscription line ("DSL") network, a broadband network, and/or a flexray network, a Wi-Fi or wireless local area network ("WLAN"), a wireless wide area network ("WWAN"), Gigabit Multimedia Serial Link (GMSL), and/or a cellular network. In some implementations, sensor data such as camera data can be received as measurement data to indicate a movement of the ECU and/or sensors. For example, cameras disposed on the vehicle can detect location changes of ECU and/or sensor(s) if the location of the ECU and/or sensor(s) is within the field of view of the camera. Of course, any type of suitable techniques and methods can be used to detect movement of the ECU and/or sensor(s). The list and examples above are not meant to be exhaustive. The IMU 112 is independent from the sensor(s) 130. Stated differently, the sensor(s) 130 in the vehicle does not include the IMU 112.

The sensor(s) can include one or more sensors, for example, cameras, radars, lidars, or sonars. The camera can be, for example, a thermal imager camera, an infrared camera, a stereo camera, a time of flight camera, an RGB camera, a 2-D camera, a 3-D camera, a 360-degree camera, etc. The radar can be, for example, an imaging radar, a 3-D radar, a 4-D radar, a short-range radar, a medium-range radar, a long-range radar, a pulse-Doppler radar, a frequency-modulated continuous-wave (FMCW) radar, etc. The lidar can be, for example, an amplitude modulated lidar, a frequency modulated lidar, a mechanical lidar, a microelectromechanical systems lidar, a flash lidar, an optical phase array lidar, a frequency-modulated continuous-wave (FMCW) lidar, a time of flight scanning lidar, etc. The sonar can be, for example, an active sonar, a passive sonar, etc. Of course, other types of sensors exist and the examples above are not meant to be exhaustive.

At 402, the method continues with causing the processor (e.g., processor 114 in FIG. 1A or processor 101 in FIG. 1B) to identify a tamper event of the ECU (e.g., ECU 110 in FIG. 1A and FIG. 1B) based on the measurement data and in response to the receiving the measurement data. The tamper event can include, for example, detection of movement of the ECU and/or sensor(s), detection of whether power supply of ECU and/or sensor(s) has been removed or if backup battery is needed, detection of changes in the ECU and/or sensor(s), detection of spoofing in the ECU and/or sensor(s). The detection of changes can include, for example, detection of whether an update (e.g., a software update) is needed in the ECU and/or sensor(s) and getting an approval for installation from a remote operation center/server, detection of lapses in communication in the ECU and/or sensor(s).

In some implementations, the tamper event detection can happen in the vehicle. In other implementations, the tamper event detection can happen outside of the vehicle. For example, tamper event can be a detection of a failure to communicate to a remote operation center/server (e.g., according to a predefined schedule), an unauthorized backup of all the firmware and settings of the ECU and/or sensor(s) in the remote operation center/server, an unauthorized system level health check for ECU and sensor(s), and spoof detection for firmware and updates. In some implementations, a backup, system level health check, system level updates, etc. are to be approved by the remote operation center/server and a failure to receive such approval indicates an unauthorized event.

At 403, the method continues with receiving, from the processor (e.g., processor 114 in FIG. 1A or processor 101 in FIG. 1B) after the tamper event has been identified and at the ECU (e.g., ECU 110 in FIG. 1A and FIG. 1B), a signal to cause the ECU (e.g., ECU 110 in FIG. 1A and FIG. 1B) to be disabled in response to the signal. In an event when the ECU and/or sensor(s) is detected to be powered up but has not, the disabling signal is directly sent to the ECU and/or sensor(s) to cause the ECU and/or sensor(s) to be disabled. In an event when the ECU and/or sensor(s) is detected to be not powered up, a signal is sent to a remote operation center, to cause the remote operation center to send the disabling signal to the ECU and/or sensor(s) when the ECU and/or sensor(s) is later powered up without authorization to cause the ECU and/or sensor(s) to be disabled in response to the signal.

In some other implementations, the tamper response is to provide a notification of the tamper event of the ECU and/or sensor(s) and send a signal to an output device to cause the output device (e.g., output device 140 in FIG. 1A and FIG. 1B) to output the notification. The notification can be for example an audible indicator (e.g., an alarm sound), a visual indicator (e.g., a flashing light), a vibrating indicator (e.g., a haptic movement), a notification message that can be sent to operation center to get approval request for installation of updates for ECU and/or sensor(s), etc.

In some implementations, the tamper response can be an alignment(s) and calibration(s) of ECU(s) and/or sensor(s) to ensure the versions and updates are compatible, and data are reliable, automatically triggering of recalibrations especially for sensor(s) such as lidars and cameras because these type of sensors have limited tolerance for error. The implementations, alignments, calibrations and recalibrations of ECU(s) and/or sensor(s) can be initiated from in the vehicle or can be initiated remotely through wireless connection. In some implementations, the tamper response can cause an improvement in data accuracy and alignment of ECU(s) and/or sensors. For example, during radar and camera sensor fusion, the IMU may detect that the resolution is limited, fusion stops working, or data doesn't align. In these situations, the tamper response can be an action to improve of the sensors' resolution and/or restart the sensor fusion, etc. In other implementations, tamper response can be an action to change or swap ECU(s) and/or sensor(s) to improve accuracy and alignment. For example, if it is determined that the ECU(s) and sensor(s) is damaged or degraded, the tamper response can be an action to cause the ECU(s) and sensor(s) to be checked more frequently and actively. Upon determination that a replacement is recommended, a signal can be sent to the remote operation center/server to get approval. In these situations, authorization/approval from the remote operation center/server can be required before the replacement can be done. Additional discussion related to sensor tamper detection are discussed in U.S. Pat. No. 11,077,825, the contents of which are incorporated in its entirety herein.

In some implementations, a tamper event can be an event associated with spoofing activities. For example, when an Address Resolution Protocol (ARP) request from a new MAC address is received at a processor at the vehicle (e.g., the ECU(s), the sensor(s) or the IMU), the information can be logged and monitored (e.g., at the processor of the ECU(s)) so when anything unexpected is connected to a processor at the vehicle, tamper event is detected. A tamper response to these kinds of situations can be, for example, shutting down the network in response to detecting an unexpected login.

In some embodiments, a method includes receiving, at a processor, measurement data from an inertial measurement unit (IMU) rigidly disposed with a housing of an electronic control unit (ECU) of an vehicle. The method also includes identifying, at the processor, a tamper event of the ECU based on the measurement data from the IMU. A signal is sent from the processor to cause a tamper response to the tamper event.

In some embodiments, the IMU, the processor, and a power source of the IMU and the processor are disposed within an interior of the housing of the ECU. The housing of the ECU is positioned within the vehicle to prevent access to the interior of the housing until after the housing of the ECU is moved.

In some embodiments, the processor is disposed with the vehicle.

In some embodiments, the processor is located remotely from the vehicle.

In some embodiments, the processor classifies by using a machine learning algorithm. The measurement data indicates a movement of the ECU relative to the vehicle.

In some embodiments, the measurement data indicates a movement of the ECU relative to the vehicle. The tamper response is disabling the ECU. The sending includes at least one of (1) sending the signal to the ECU when the ECU is powered up, to cause the ECU to be disabled in response to the signal, or (2) sending the signal to a remote compute device when the ECU is not powered up, to cause the remote device to send the signal to the ECU when the ECU is later powered up to cause the ECU to be disabled in response to the signal.

In some embodiments, the measurement data indicates a movement of the ECU relative to the vehicle. The tamper response is providing a notification of the tamper event of the ECU. The sending includes sending the signal to an output device to cause the output device to output the notification.

In some embodiments, the ECU has a power source operatively coupled to a power source of the vehicle, and the IMU has a power source independent from the power source of the ECU.

In some embodiments, the ECU has a power source operatively coupled to a power source of the vehicle, and a power source of the IMU and the processor is a battery.

In some embodiments, the ECU is configured to receive sensor data from each sensor from a plurality of sensors disposed with the vehicle and to receive information from a plurality of operational systems of the vehicle.

In some embodiments, the IMU is not directly coupled to a chassis of the vehicle.

In some embodiments, a system, comprises an electronic control unit (ECU) having a housing and configured to be disposed within an interior of an vehicle. The system also comprises an inertial measurement unit (IMU) rigidly disposed with the housing of the ECU, the IMU powered by a battery separate from a power source of the ECU. The system also comprises a processor configured to receive measurement data from the IMU, the processor configured to identify a tamper event of the ECU based on the measurement data from the IMU, the processor configured to send a signal to cause a tamper response of the tamper event.

In some embodiments, the vehicle includes a plurality of sensors, the plurality of sensors does not include the IMU. The measurement data indicates a movement of the ECU relative to the vehicle and does not indicate movement of any sensor from the plurality of sensors In some embodiments, the system further comprises a communications interface operatively coupled to the IMU and configured to operatively couple the IMU to the processor via a wireless network. The processor is located remotely from the vehicle.

In some embodiments, the system further comprises an output device disposed with the vehicle. The tamper response is (1) disabling the ECU and (2) providing a notification of the tamper event of the ECU. The processor is configured to send the signal to the ECU to cause the ECU to be disabled and the output device to output the notification, in response to the signal.

In some embodiments, the processor is associated with security of the ECU and not associated with steering the vehicle, and the IMU is configured to send the measurement data to the processor and not to a processor associated with steering the vehicle.

In some embodiments, the processor is disposed within the housing and power by the battery. The system further comprises a first memory disposed within the housing and operatively coupled to the processor. The processor is configured to store at least one of IMU state data or IMU change of state data in the memory. The ECU is configured to access at least one of IMU state data or IMU change of state data in the memory, upon power up of the ECU.

In some embodiments, a method comprises sending, from an inertial measurement unit (IMU) rigidly disposed with a housing of an electronic control unit (ECU) of an vehicle, measurement data to a processor to cause the processor to identify a tamper event of the ECU based on the measurement data and in response to the receiving the measurement data, the measurement data indicating a movement of the ECU relative to the vehicle. The method also comprises receiving, from the processor after the tamper event has been identified and at the ECU, a signal to cause the ECU to be disabled in response to the signal.

In some embodiments, the ECU has a power source operatively coupled to a power source of the vehicle. The IMU has a power source independent from the power source of the ECU.

In some embodiments, the ECU has a power source operatively coupled to a power source of the vehicle. A power source of the IMU and the processor is a battery.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational algorithm, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

As used herein, "substantially concurrently" can refer to events that take place at the same time when adjusted for processing-related delays (e.g., computation delay, transmission delay, etc.), or can refer to events that overlap in time.

As used herein, "substantially in real-time" can refer to an event that occurs immediately following a predicate event, adjusted for processing-related delays (e.g., computation delay, transmission delay, etc.).

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A non-transitory, computer-readable storage medium including instructions that, when executed by at least one processor of a computing system, cause the computing system to perform operations comprising:
    receiving measurement data from an inertial measurement unit (IMU) disposed within a housing of an electronic control unit (ECU) of a vehicle, the housing including the IMU, a power source for the IMU, and a processor to receive the measurement data and not including any of a power source of the vehicle, an engine of the vehicle, a camera, a radar, and a lidar;
    identifying a tamper event associated with the ECU based on the measurement data from the IMU; and
    sending a signal to cause a tamper response to the tamper event, wherein, in response to identification of the tamper event.

2. The non-transitory, computer-readable medium of claim 1, wherein:
    the vehicle includes a plurality of sensors that include the camera, the radar, or the lidar, the plurality of sensors do not include the IMU; and
    the measurement data indicates a movement of the ECU relative to the vehicle and does not indicate movement of any sensor from the plurality of sensors.

3. The non-transitory, computer-readable medium of claim 1, wherein:
    the ECU is disposed within the vehicle, and
    the measurement data indicates a movement of the ECU relative to the vehicle.

4. The non-transitory, computer-readable medium of claim 1, wherein:
    the measurement data indicates a movement of the ECU relative to the vehicle,
    the tamper response disables the ECU, and the sending is associated with at least one of (1) an instruction to send the signal to the ECU when the ECU is powered up, to cause the ECU to be disabled in response to the signal, or (2) an instruction to send the signal to a remote compute device when the ECU is not powered up, to cause the remote device to send the signal to the ECU when the ECU is later powered up to cause the ECU to be disabled in response to the signal.

5. The non-transitory, computer-readable medium of claim 1, wherein:
the measurement data indicates a movement of the ECU relative to the vehicle,
the tamper response is provides a notification of the tamper event of the ECU, and
the sending includes sending the signal to an output device to cause the output device to output the notification.

6. The non-transitory, computer-readable medium of claim 1, wherein:
the power source for the IMU and the processor is a battery.

7. The non-transitory, computer-readable medium of claim 1, wherein the ECU is configured to receive sensor data from each sensor of a plurality of sensors disposed with the vehicle and to receive information from a plurality of operational systems of the vehicle.

8. The non-transitory, computer-readable medium of claim 1, wherein the IMU is not directly coupled to a chassis of the vehicle.

9. The non-transitory, computer-readable medium of claim 1, wherein the vehicle includes sensors associated with sensor fusion, and the tamper response is an action to improve resolution of the sensors or restart the sensor fusion in response to at least one of limited resolution of data associated with the sensor fusion, ceased operation of the sensor fusion, and misalignment of the data.

10. A system comprising:
an electronic control unit (ECU) having a housing and configured to be disposed within an interior of a vehicle;
an inertial measurement unit (IMU) disposed within the housing of the ECU; and
a processor configured to receive measurement data from the IMU and to identify a tamper event of the ECU based on the measurement data, the processor further configured to send a signal to cause a tamper response to the tamper event,
wherein the housing includes the IMU and a power source for the IMU and does not include any of a power source of the vehicle, an engine of the vehicle, a camera, a radar, and a lidar.

11. The system of claim 10, wherein:
the vehicle includes a plurality of sensors that include the camera, the radar, or the lidar, and the plurality of sensors do not include the IMU; and
the measurement data indicates a movement of the ECU relative to the vehicle and does not indicate movement of any sensor from the plurality of sensors.

12. The system of claim 10, further comprising:
a communications interface operatively coupled to the IMU and configured to operatively couple the IMU to the processor via a wireless network,
the processor being located remotely from the vehicle.

13. The system of claim 10, further comprising:
an output device disposed with the vehicle,
the tamper response (1) disabling the ECU and (2) providing a notification of the tamper event of the ECU,
the processor configured to send the signal to the ECU to cause the ECU to be disabled and the output device to output the notification, in response to the signal.

14. The system of claim 10, wherein:
the processor is associated with security of the ECU and not associated with steering the vehicle, and
the IMU is configured to send the measurement data to the processor and not to a processor associated with steering the vehicle.

15. The system of claim 10, wherein the processor is disposed within the housing, the system further comprising:
a memory disposed within the housing and operatively coupled to the processor, the processor configured to store at least one of IMU state data or IMU change of state data in the memory,
the ECU configured to access at least one of IMU state data or IMU change of state data in the memory, upon power up of the ECU.

16. The system of claim 10, wherein the vehicle includes sensors associated with sensor fusion, and the tamper response is an action to improve resolution of the sensors or restart the sensor fusion in response to at least one of limited resolution of data associated with the sensor fusion, ceased operation of the sensor fusion, and misalignment of the data.

17. A method comprising:
sending, from an inertial measurement unit (IMU) disposed within a housing of an electronic control unit (ECU) of a vehicle, measurement data causing identification of a tamper event of the ECU and indicating a movement of the ECU relative to the vehicle, the housing including the IMU, a power source for the IMU, and a processor to receive the measurement data and not including any of a power source of the vehicle, an engine of the vehicle, a camera, a radar, and a lidar; and
receiving, after the tamper event has been identified and at the ECU, a signal to cause a tamper response to the tamper event.

18. The method of claim 17, wherein:
the power source for the IMU and the processor is a battery.

19. The method of claim 17, wherein the vehicle includes sensors associated with sensor fusion, and the tamper response is an action to improve resolution of the sensors or restart the sensor fusion in response to at least one of limited resolution of data associated with the sensor fusion, ceased operation of the sensor fusion, and misalignment of the data.

20. The method of claim 17, wherein:
the vehicle includes a plurality of sensors that include the camera, the radar, or the lidar, the plurality of sensors do not include the IMU; and
the measurement data indicates a movement of the ECU relative to the vehicle and does not indicate movement of any sensor from the plurality of sensors.

* * * * *